(12) United States Patent
Chen et al.

(10) Patent No.: US 9,980,566 B2
(45) Date of Patent: May 29, 2018

(54) SLIDE RAIL ASSEMBLY

(71) Applicants: KING SLIDE WORKS CO., LTD., Kaohsiung (TW); KING SLIDE TECHNOLOGY CO.,LTD., Kaohsiung (TW)

(72) Inventors: Ken-Ching Chen, Kaohsiung (TW); Shun-Ho Yang, Kaohsiung (TW); Chih-Hsin Yeh, Kaohsiung (TW); Chun-Chiang Wang, Kaohsiung (TW)

(73) Assignees: KING SLIDE WORKS CO., LTD., Kaohsiung (TW); KING SLIDE TECHNOLOGY CO., LTD., Kaohsiung (TW)

( * ) Notice: Subject to any disclaimer, the term of this patent is extended or adjusted under 35 U.S.C. 154(b) by 0 days. days.

(21) Appl. No.: 15/255,152

(22) Filed: Sep. 2, 2016

(65) Prior Publication Data

US 2017/0159710 A1    Jun. 8, 2017

(30) Foreign Application Priority Data

Dec. 4, 2015   (TW) .............................. 104140880 A

(51) Int. Cl.
| | |
|---|---|
| A47B 88/44 | (2017.01) |
| F16C 43/04 | (2006.01) |
| A47B 88/49 | (2017.01) |
| A47B 88/48 | (2017.01) |
| A47B 88/493 | (2017.01) |
| A47B 88/487 | (2017.01) |
| A47B 88/423 | (2017.01) |

(52) U.S. Cl.
CPC ............ *A47B 88/44* (2017.01); *A47B 88/487* (2017.01); *A47B 88/493* (2017.01); *F16C 43/04* (2013.01);

(Continued)

(58) Field of Classification Search
CPC .... A47B 2210/0016; A47B 2210/0018; A47B 2210/0032; A47B 2210/0035;
(Continued)

(56) References Cited

U.S. PATENT DOCUMENTS

| 3,904,254 A | 9/1975 | Hagen |
|---|---|---|
| 4,370,007 A | 1/1983 | Fler |

(Continued)

FOREIGN PATENT DOCUMENTS

| GB | 2400786 A | * 10/2004 | ............. A47B 88/40 |
|---|---|---|---|
| JP | 3079443 U | 8/2001 | |
| JP | 3138146 U | 12/2007 | |

OTHER PUBLICATIONS

JP3138146 Translated Description, 9 pages (Year: 2007).*

*Primary Examiner* — Andrew M Roersma
(74) *Attorney, Agent, or Firm* — Winston Hsu

(57) ABSTRACT

A slide rail assembly includes a first rail, a second rail, a blocking base, a ball retainer and a blocking member. The second rail is movable relative to the first rail. The blocking base is arranged on the first rail and has a limiting part. The ball retainer is configured to facilitate the second rail to move relative to the first rail. The ball retainer has a contact part. When the blocking member is in a first state, the blocking member is configured to push the contact part of the ball retainer to move the ball retainer in response to a movement of the second rail until the blocking member abuts against the limiting part of the blocking base. When the blocking member is in a second state, the blocking member no longer abuts against the limiting part of the blocking base.

15 Claims, 8 Drawing Sheets

(52) U.S. Cl.
CPC ............ *A47B 2088/4235* (2017.01); *A47B 2210/0016* (2013.01); *A47B 2210/0018* (2013.01); *A47B 2210/0032* (2013.01); *A47B 2210/0035* (2013.01); *A47B 2210/0059* (2013.01); *F16C 2314/72* (2013.01)

(58) Field of Classification Search
CPC .... A47B 2210/0064; A47B 2210/0067; A47B 2210/007; A47B 88/44; A47B 88/443; A47B 88/447; A47B 88/473; A47B 88/477; A47B 88/40; A47B 88/53; A47B 88/57; A47B 88/16
See application file for complete search history.

(56) References Cited

U.S. PATENT DOCUMENTS

| | | | |
|---|---|---|---|
| 6,367,899 B1 * | 4/2002 | Hwang | A47B 88/493 312/334.44 |
| 6,412,891 B1 * | 7/2002 | Liang | A47B 88/487 312/333 |
| 6,945,619 B1 * | 9/2005 | Chen | A47B 88/487 312/334.44 |
| 7,918,517 B2 | 4/2011 | Chen | |
| 8,752,917 B1 * | 6/2014 | Chang | A47B 88/14 312/333 |
| 2002/0089274 A1 | 7/2002 | Liang | |
| 2004/0145285 A1 * | 7/2004 | Hwang | A47B 88/493 312/333 |
| 2004/0174104 A1 | 9/2004 | Chen | |
| 2006/0244349 A1 * | 11/2006 | Chen | A47B 88/493 312/334.47 |
| 2012/0027325 A1 * | 2/2012 | Lacarra | A47B 88/487 384/18 |
| 2013/0058596 A1 * | 3/2013 | Chen | F16C 29/005 384/7 |
| 2014/0327352 A1 * | 11/2014 | Chen | E05D 15/0686 312/334.46 |

* cited by examiner

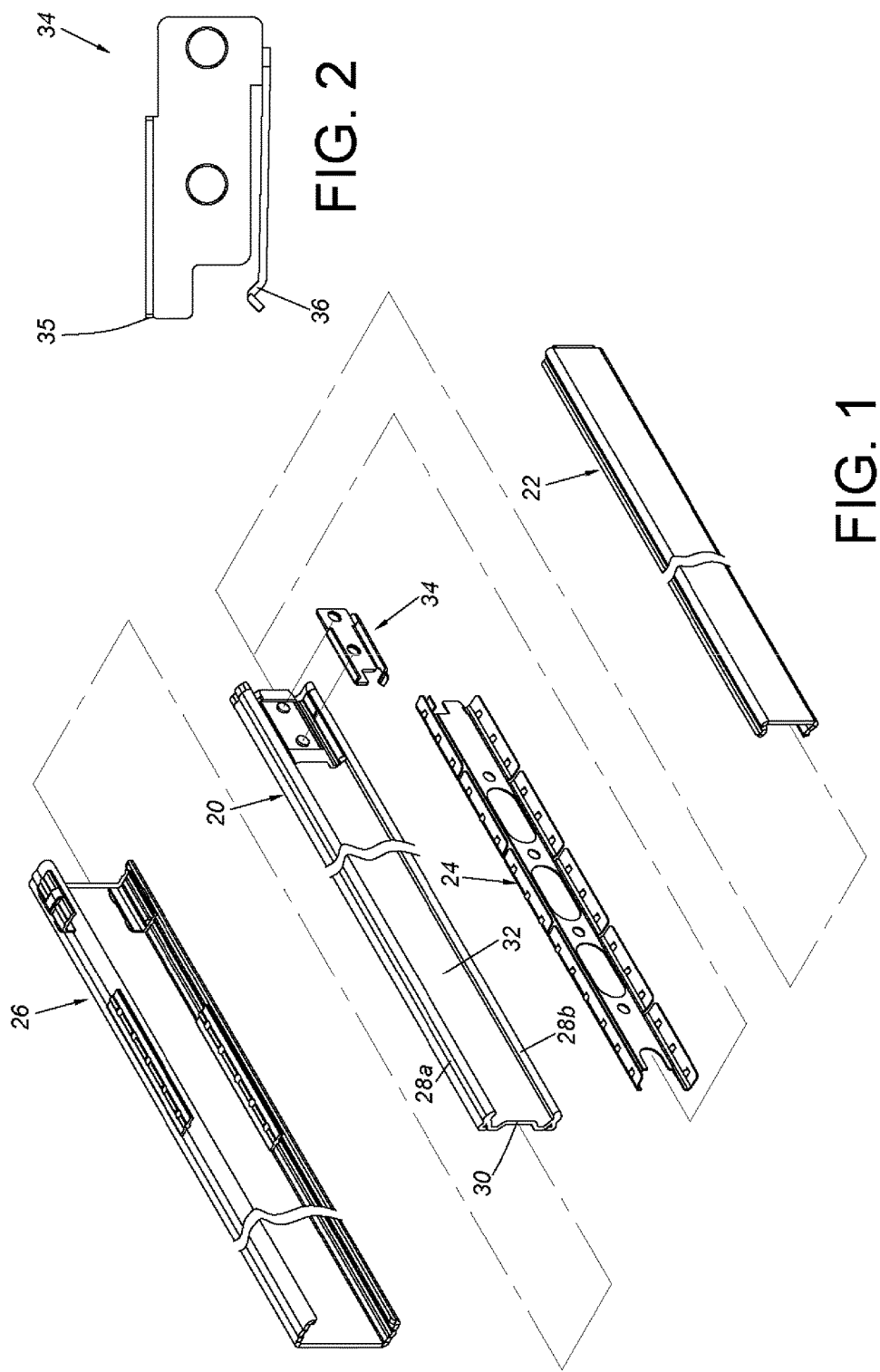

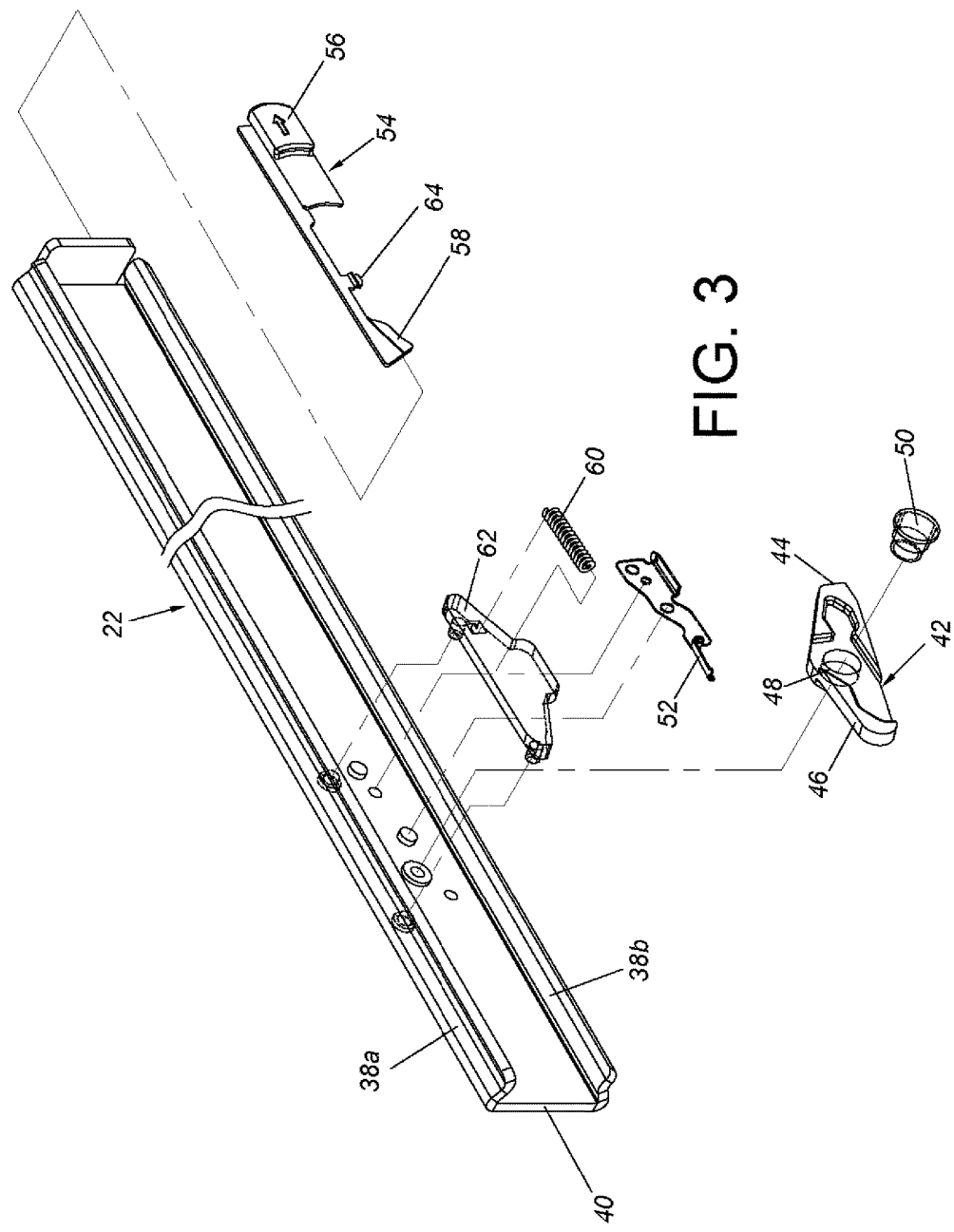

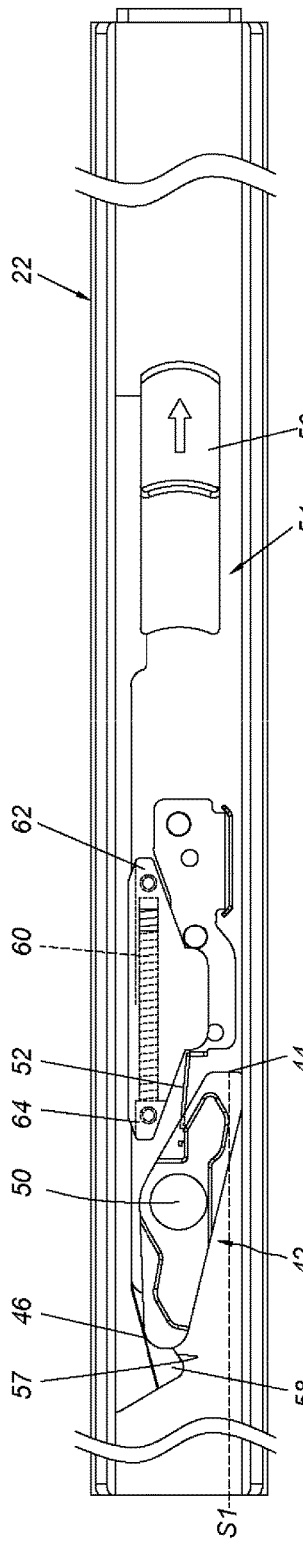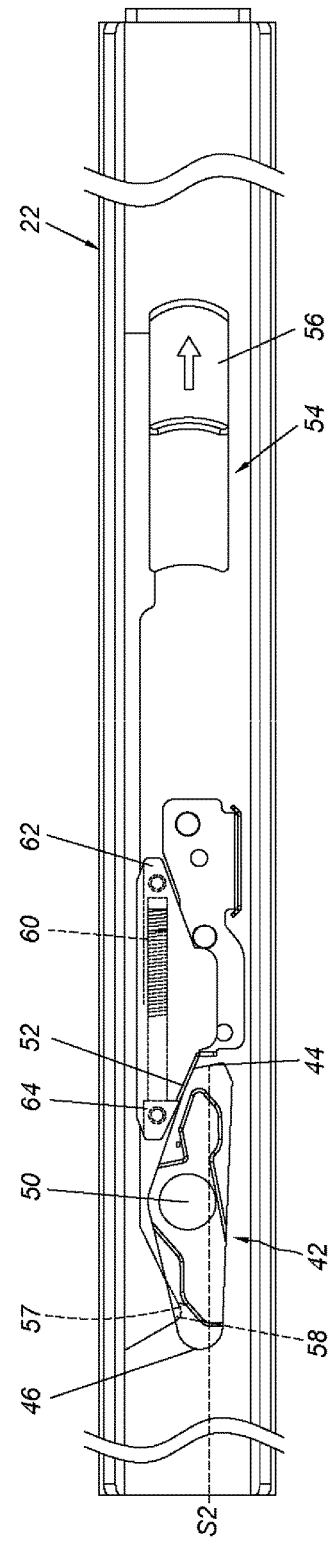

SLIDE RAIL ASSEMBLY

BACKGROUND OF THE INVENTION

1. Field of the Invention

The present invention relates to a slide rail assembly, and more particularly, to a slide rail assembly having a ball retainer configured to be moved to a predetermined position.

2. Description of the Prior Art

Generally, a slide rail assembly comprises at least two rails, such as a first rail and a second rail. The second rail is movable relative to the first rail. Wherein, a ball retainer is usually mounted between the first rail and the second rail in order to facilitate the second rail to move smoothly relative to the first rail. For example, U.S. Pat. No. 3,904,254 A discloses a slide mechanism. The slide mechanism comprises an outer slide member (24), an inner slide member (26) and a ball retainer (60). The ball retainer (60) is mounted between the outer slide member (24) and the inner slide member (26). Wherein, the inner slide member (26) has a recycle tab (49). The ball retainer (60) also has a counter tab (67) configured to be engaged with the recycle tab (49) of the inner slide member (26), in order to allow the inner slide member (26) to drive the ball retainer (60). However, the rail is not detachable, such that the rail is inconvenient to use.

U.S. Pat. No. 3,904,254 A provides a slide mechanism having the inner slide member capable of driving the ball retainer to move. However, for diversity of functions, slide rail assemblies with different operating methods can be provided to bring more options to the market.

SUMMARY OF THE INVENTION

The present invention relates to a slide rail assembly having a ball retainer capable of being moved along a direction.

According to an embodiment of the present invention, a slide rail assembly comprises a first rail, a second rail, a blocking base, a ball retainer and a blocking member. The second rail is movable relative to the first rail. The blocking base is arranged on the first rail. The blocking base has a limiting part. The ball retainer comprises a plurality of rolling members. The ball retainer is mounted between the first rail and the second rail. The ball retainer has a contact part. The blocking member is mounted on the second rail, and configured to be operatively moved from a first state to a second state. Wherein, when the blocking member is in the first state and the second rail is moved relative to the first rail along a direction to a predetermined position, the blocking member pushes the contact part of the ball retainer to move the ball retainer along the direction until the blocking member abuts against the limiting part of the blocking base. Wherein, when the blocking member is operatively moved from the first state to the second state, the blocking member no longer abuts against the limiting part of the blocking base for allowing the second rail to be detached from the first rail.

Preferably, the first rail has a front end. The blocking base is arranged on the first rail and adjacent to the front end of the first rail.

Preferably, the blocking base further has an elastic arm. The ball retainer further has an engagement feature. When the ball retainer is moved along the direction until the blocking member abuts against the limiting part of the blocking base, the engagement feature is engaged with the elastic arm.

Preferably, the ball retainer comprises an upper wall, a lower wall and a longitudinal wall connected between the upper wall and the lower wall. The plurality of rolling members are mounted to the upper wall and the lower wall of the ball retainer.

Preferably, the blocking member comprises a blocking part, a releasing part and a pivoting part located between the blocking part and the releasing part. The slide rail assembly further comprises a pivoting member passing through the pivoting part for pivotally connecting the blocking member to the second rail.

Preferably, the slide rail assembly further comprises a first elastic member. The blocking member is configured to be held in the first state relative to the second rail in response to an elastic force of the first elastic member.

Preferably, the slide rail assembly further comprises an operating member. The operating member comprises an abutting part facing toward the releasing part of the blocking member for allowing the operating member to operatively move the blocking member from the first state to the second state.

Preferably, the slide rail assembly further comprises a second elastic member configured to provide an elastic force to the operating member.

Preferably, one of the abutting part of the operating member and the releasing part of the blocking member has a guiding surface for facilitating the operating member to drive the blocking member to move through the abutting part.

Preferably, the first rail comprises an upper wall, a lower wall and a longitudinal wall connected between the upper wall and the lower wall. A passage is defined by the upper wall, the lower wall and the longitudinal wall. The second rail is configured to be mounted within the passage.

According to another embodiment of the present invention, a slide rail assembly comprises a first rail, a second rail, a blocking base, a ball retainer and a blocking member. The second rail is movable relative to the first rail. The blocking base is arranged on the first rail. The blocking base has a limiting part. The ball retainer is configured to facilitate the second rail to move relative to the first rail. The ball retainer has a contact part. The blocking member is configured to be operatively moved from a first state to a second state relative to the second rail. Wherein, when the blocking member is in the first state, the blocking member is configured to push the contact part of the ball retainer to move the ball retainer in response to a movement of the second rail until the blocking member abuts against the limiting part of the blocking base. Wherein, when the blocking member is in the second state, the blocking member no longer abuts against the limiting part of the blocking base.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is an exploded view of a slide rail assembly according to an embodiment of the present invention.

FIG. 2 is a diagram showing a blocking base of the slide rail assembly according to an embodiment of the present invention.

FIG. 3 is a diagram showing a second rail of the slide rail assembly arranged with a blocking member and an operating member.

FIG. 4 is a diagram showing the blocking member being held in a first state relative to the second rail in response to an elastic force of a first elastic member.

FIG. 5 is a diagram showing the blocking member being operatively moved from the first state to a second state by the operating member.

DETAILED DESCRIPTION

Figure 6:
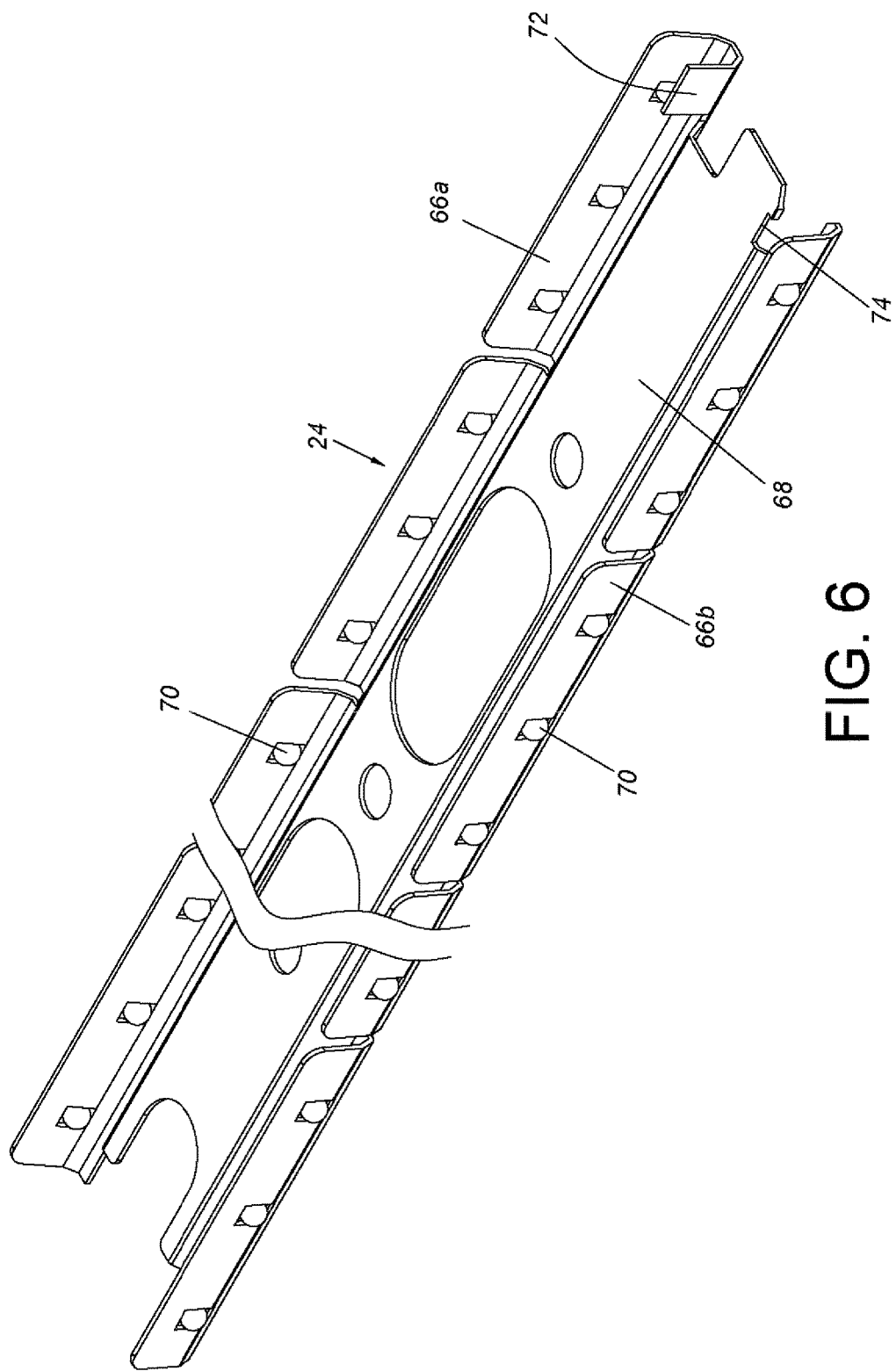
FIG. 6 is a diagram showing a ball retainer of the slide rail assembly according to an embodiment of the present invention.

As shown in FIG. 1, a slide rail assembly of the present invention comprises a first rail 20, a second rail 22 and a ball retainer 24 mounted between the first rail 20 and the second rail 22. Preferably, the slide rail assembly further comprises a third rail 26 movably connected with the first rail 20 in order to extend a travel distance of the slide rail assembly. Wherein, the first rail 20 comprises an upper wall 28a, a lower wall 28b and a longitudinal wall 30 connected between the upper wall 28a and the lower wall 28b. A passage 32 is defined by the upper wall 28a, the lower wall 28b and the longitudinal wall 30. The second rail 22 is configured to be mounted within the passage 32. A blocking base 34 is arranged on the first rail 20 and adjacent to a front end of the first rail 20. As shown in FIG. 2, a limiting part 35 and an elastic arm 36 are respectively arranged at two sides of the blocking base 34. The second rail 22 is movable relative to the first rail 20 within the passage 32 of the first rail 20.

As shown in FIG. 3 and FIG. 4, the second rail 22 comprises an upper wall 38a, a lower wall 38b and a longitudinal wall 40 connected between the upper wall 38a and the lower wall 38b. The slide rail assembly further comprises a blocking member 42 mounted to the longitudinal wall 40 of the second rail 22. The blocking member 42 comprises a blocking part 44, a releasing part 46 and a pivoting part 48 located between the blocking part 44 and the releasing part 46. Wherein, the slide rail assembly further comprises a pivoting member 50 passing through the pivoting part 48 of the blocking member 42 for pivotally connecting the blocking member 42 to the longitudinal wall 40 of the second rail 22. Preferably, the slide rail assembly further comprises a first elastic member 52 and an operating member 54. Particularly, the first elastic member 52 is arranged on the longitudinal wall 40 of the second rail 22 for providing an elastic force to the blocking member 42. The blocking member 42 is configured to be held in a first state S1 relative to the second rail 22 in response to the elastic force of the first elastic member 52. The operating member 54 is movably connected to the second rail 22. The operating member 54 comprises an operating part 56 and an abutting part 58. The abutting part 58 faces toward the releasing part 46 of the blocking member 42. Preferably, one of the abutting part 58 and the releasing part 46 has a guiding surface 57. For example, the abutting part 58 has a curved surface for driving (such as pushing) the releasing part 46 of the blocking member 42. According to the above arrangement, the operating member 54 is configured to operatively move the blocking member 42 from the first state S1 to a second state S2 (refer to FIG. 5). Preferably, the slide rail assembly further comprises a second elastic member 60 configured to provide an elastic force to the operating member 54. In the present embodiment, the second elastic member 60 is mounted to the longitudinal wall 40 of the second rail 22 through a mounting base 62, and the second elastic member 60 is configured to provide the elastic force to a predetermined force receiving part 64 of the operating member 54. As such, after the operating part 56 of the operating member 54 is operatively moved by an external force, the operating member 54 returns to an initial position in response to the elastic force generated by the second elastic member 60 once the external force no longer exists.

As shown in FIG. 6, the ball retainer 24 comprises an upper wall 66a, a lower wall 66b, a longitudinal wall 68 connected between the upper wall 66a and the lower wall 66b, and a plurality of rolling members 70 mounted on the upper wall 66a and the lower wall 66b of the ball retainer 24. The plurality of rolling members 70 can be balls or roll wheels contacting between the first rail 20 and the second rail 22, in order to facilitate the second rail 22 to move smoothly relative to the first rail 20. In the present embodiment, a contact part 72 and an engagement feature 74 are arranged at a front end of the ball retainer 24.

Figure 7:
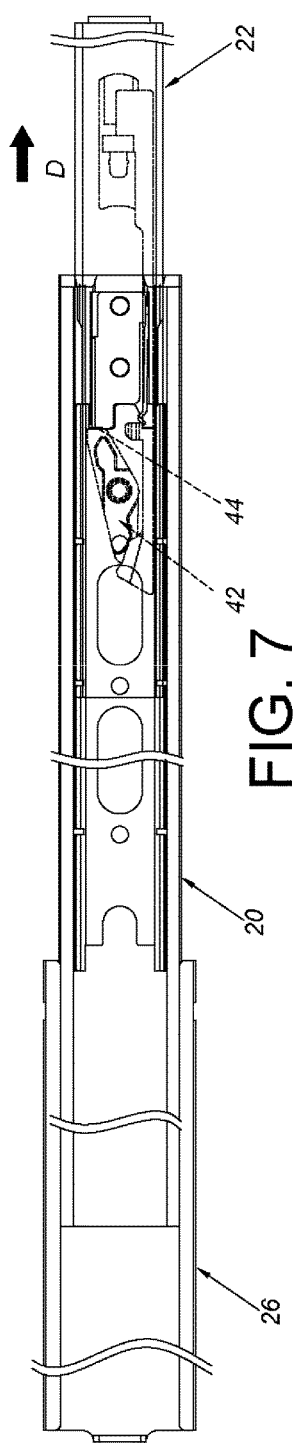
FIG. 7 is a diagram showing a first rail and the second rail being pulled out along a direction relative to a third rail from with the blocking member 42 being arranged in the first state.
Figure 8:
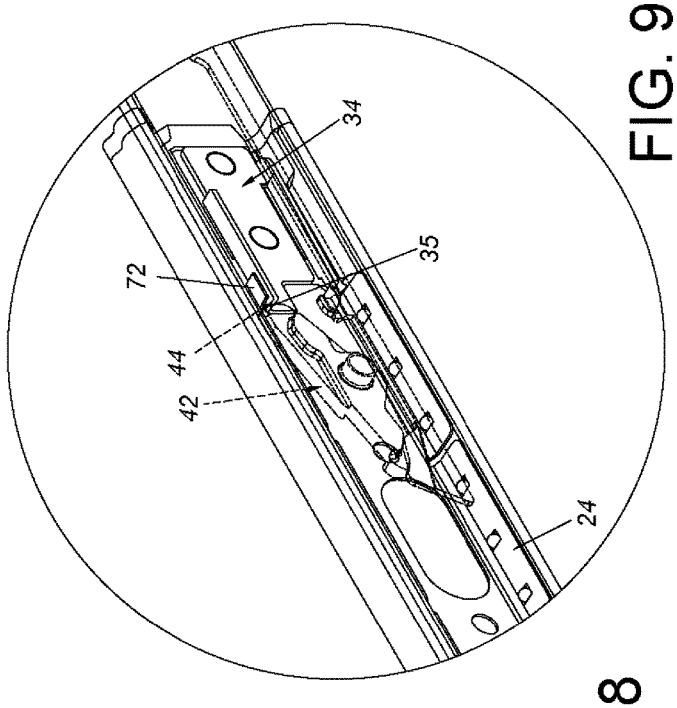
FIG. 8 is a diagram showing a contact part of the ball retainer being pushed by a blocking part of the blocking member when the second rail is pulled out relative to the first rail.
Figure 9:
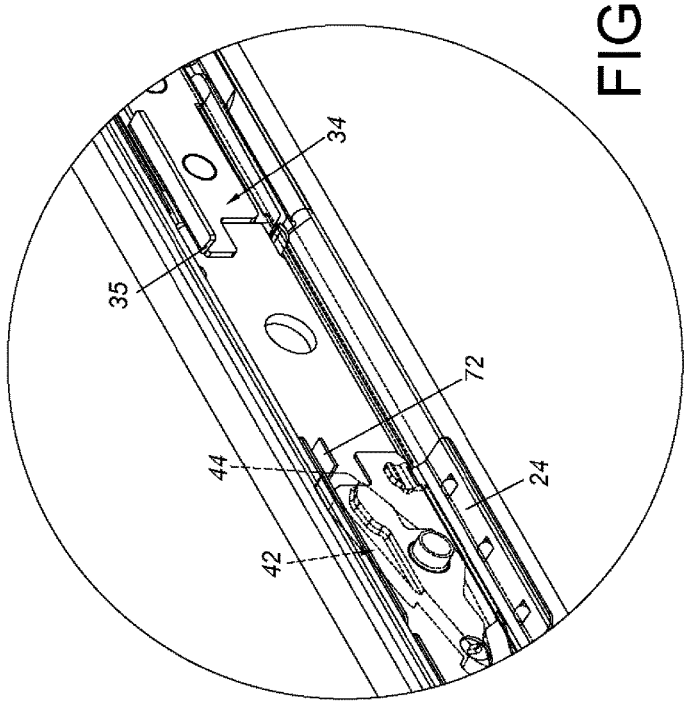
FIG. 9 is a diagram showing the blocking part of the blocking member further abutting against a limiting part of the blocking base on the first rail when the second rail is pulled out relative to the first rail.

As shown in FIG. 7 to FIG. 9, when the first rail 20 and the second rail 22 are pulled out along a direction D (such as an extending direction) relative to the third rail 26 from a close state with the blocking member 42 being arranged in the first state S1 (a state that the blocking member 42 is not operatively moved, as shown in FIG. 4), the blocking part 44 of the blocking member 42 corresponds to the contact part 72 of the retainer 24 and the abutting part 35 of the blocking base 34. Wherein, the contact part 72 of the ball retainer 24 is apart from the abutting part 35 of the blocking base 34. As such, when the second rail 22 is pulled out relative to the first rail 20 to move to a predetermined position, the contact part 72 of the ball retainer 24 is pushed by the blocking part 44 of the blocking member 42 first, such that the ball retainer 24 is moved. Thereafter, the blocking part 44 of the blocking member 42 further abuts against the limiting part 35 of the blocking base 34 on the first rail 20.

Figure 10:
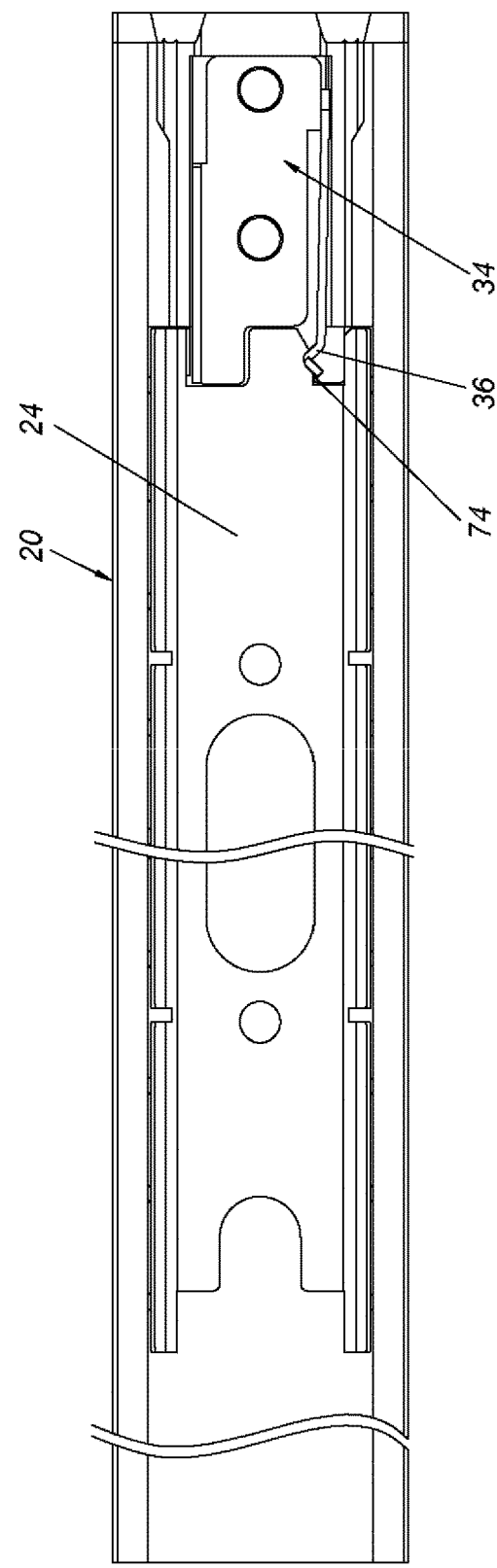
FIG. 10 is a diagram showing an engagement feature of the ball retainer being engaged with an elastic arm of the blocking base when the ball retainer is moved to be close to a front end of the first rail.
Figure 11:
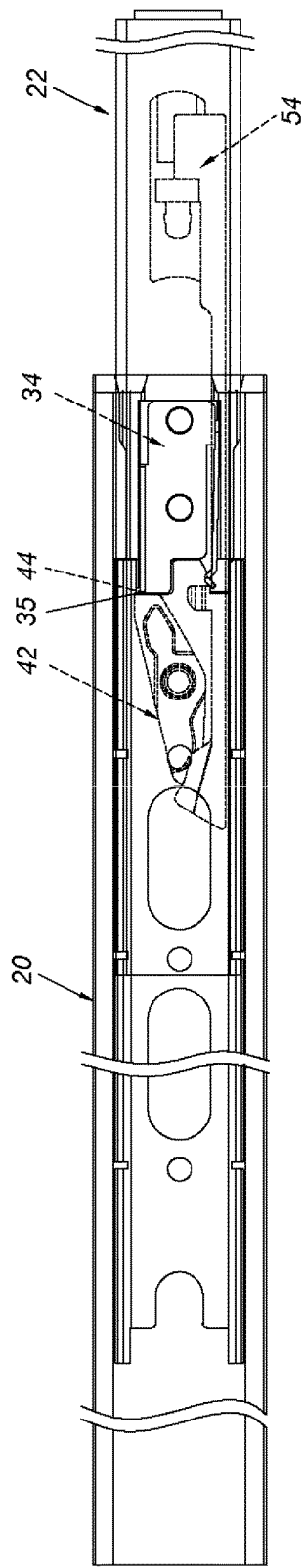
FIG. 11 is a diagram showing the blocking part of the blocking member abutting against the limiting part of the blocking base for preventing the second rail from being further pulled out relative to the first rail.

As shown in FIG. 10, when the ball retainer 24 is moved to be close to the front end of the first rail 20, the engagement feature 74 of the ball retainer 24 is engaged with the elastic arm 36 of the blocking base 34 on the first rail 20, such that the ball retainer 24 can be temporarily held at a position. On the other hand, as shown in FIG. 11, the blocking part 44 of the blocking member 42 further abuts against the limiting part 35 of the blocking base 34, such that the second rail 22 cannot be further pulled out relative to the first rail.

Figure 12:
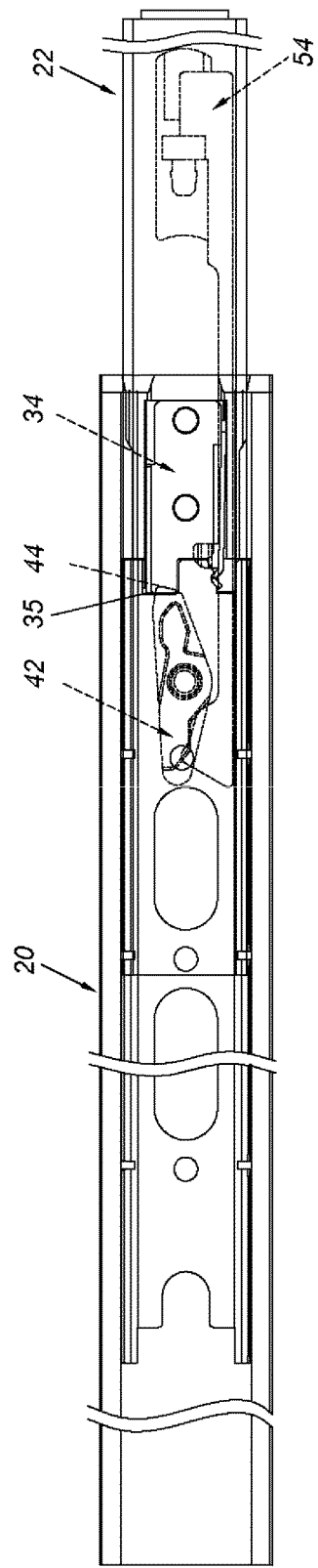
FIG. 12 is a diagram showing the blocking member being operatively moved to disengage from the limiting part of the blocking base.
Figure 13:
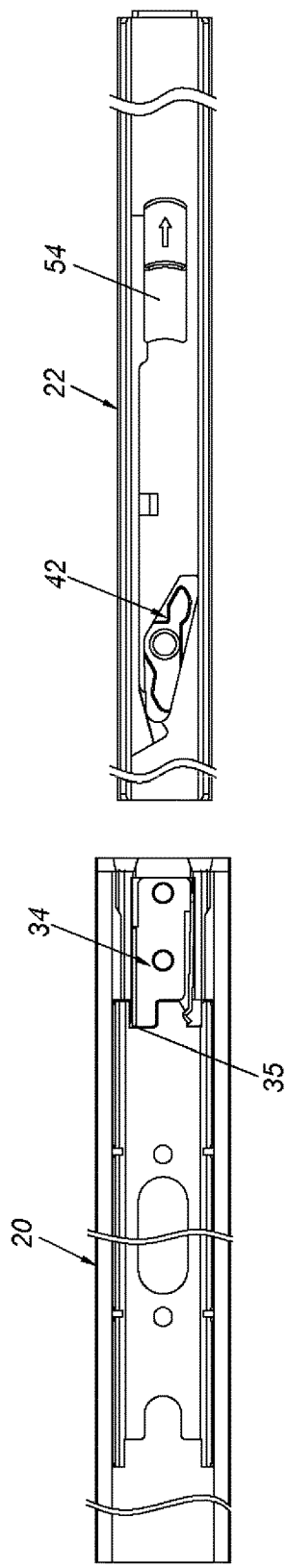
FIG. 13 is a diagram showing the second rail being detached from the first rail.

As shown in FIG. 12 and FIG. 13, when the operating member 54 is operated, the blocking member 42 is operatively moved in response to operation of the operating member 54. Accordingly, the blocking member 42 no longer abuts against the limiting part 35 of the blocking base 34 and is disengaged from the limiting part 35 of the blocking base 34, such that the second rail 22 can be detached from the first rail 20.

According to the above illustration, the arrangement of the detachable slide rail assembly can ensure that the ball retainer 24 is driven to move to the front end of the first rail, in order to facilitate the second rail to move smoothly relative to the first rail and provide better support.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A slide rail assembly, comprising:
a first rail;
a second rail movable relative to the first rail, the second rail being detachable from the first rail;
a blocking base arranged on the first rail, the blocking base having a limiting part;
a ball retainer comprising a plurality of rolling members, the ball retainer being mounted between the first rail and the second rail, the ball retainer having a contact part; and
a blocking member pivoted to the second rail, the blocking member being operatively moved from a first state to a second state in a rotatable manner;
wherein when the blocking member is in the first state and the second rail is moved relative to the first rail along a direction to a predetermined position, the blocking member pushes the contact part of the ball retainer to synchronously move the ball retainer with the second rail along the direction until the blocking member abuts against the limiting part of the blocking base to prevent the second rail from being detached from the first rail;
wherein when the blocking member is operatively moved from the first state to the second state, the blocking member no longer abuts against the contact part of the ball retainer and the limiting part of the blocking base for allowing the second rail to be detached from the first rail.

2. The slide rail assembly of claim 1, wherein the first rail has a front end, and the blocking base is arranged on the first rail and adjacent to the front end of the first rail.

3. The slide rail assembly of claim 1, wherein the blocking base further has an elastic arm, the ball retainer further has an engagement feature, and when the ball retainer is moved along the direction until the blocking member abuts against the limiting part of the blocking base, the engagement feature is engaged with the elastic arm.

4. The slide rail assembly of claim 1, wherein the ball retainer comprises an upper wall, a lower wall and a longitudinal wall connected between the upper wall and the lower wall, and the plurality of rolling members are mounted to the upper wall and the lower wall of the ball retainer.

5. The slide rail assembly of claim 1, wherein the blocking member comprises a blocking part, a releasing part and a pivoting part located between the blocking part and the releasing part, the slide rail assembly further comprises a pivoting member passing through the pivoting part for pivotally connecting the blocking member to the second rail.

6. The slide rail assembly of claim 5, further comprising a first elastic member, wherein the blocking member is configured to be held in the first state relative to the second rail in response to an elastic force of the first elastic member.

7. The slide rail assembly of claim 5, further comprising an operating member, wherein the operating member comprises an abutting part facing toward the releasing part of the blocking member for allowing the operating member to operatively move the blocking member from the first state to the second state.

8. The slide rail assembly of claim 7, further comprising a second elastic member configured to provide an elastic force to the operating member.

9. The slide rail assembly of claim 7, wherein one of the abutting part of the operating member and the releasing part of the blocking member has a guiding surface for facilitating the operating member to drive the blocking member to move through the abutting part.

10. The slide rail assembly of claim 1, wherein the first rail comprises an upper wall, a lower wall and a longitudinal wall connected between the upper wall and the lower wall, a passage is defined by the upper wall, the lower wall and the longitudinal wall, the second rail is configured to be mounted within the passage.

11. A slide rail assembly, comprising:
a first rail;
a second rail movable relative to the first rail, the second rail being detachable from the first rail;
a blocking base arranged on the first rail, the blocking base having a limiting part;
a ball retainer configured to facilitate the second rail in moving relative to the first rail, the ball retainer having a contact part; and
a blocking member pivoted to the second rail, the blocking member being operatively moved from a first state to a second state relative to the second rail in a rotatable manner;
wherein when the blocking member is in the first state, the blocking member is configured to push the contact part of the ball retainer to synchronously move the ball retainer with the second rail in response to a movement of the second rail until the blocking member abuts against the limiting part of the blocking base to prevent the second rail from being detached from the first rail;
wherein when the blocking member is in the second state, the blocking member no longer abuts against the contact part of the ball retainer and the limiting part of the blocking base.

12. The slide rail assembly of claim 11, wherein the blocking base further has an elastic arm, the ball retainer further has an engagement feature, and when the ball retainer is moved until the blocking member abuts against the limiting part of the blocking base, the engagement feature is engaged with the elastic arm.

13. The slide rail assembly of claim 11, wherein the blocking member comprises a blocking part, a releasing part and a pivoting part located between the blocking part and the releasing part, the slide rail assembly further comprises a pivoting member passing through the pivoting part for pivotally connecting the blocking member to the second rail.

14. The slide rail assembly of claim 11, further comprising a first elastic member, the blocking member is configured to be held in the first state relative to the second rail in response to an elastic force of the first elastic member.

15. The slide rail assembly of claim 13, further comprising an operating member, wherein the operating member comprises an abutting part facing toward the releasing part of the blocking member for allowing the operating member to operatively move the blocking member from the first state to the second state.

\* \* \* \* \*